United States Patent [19]

Kumai

[11] 4,324,454
[45] Apr. 13, 1982

[54] ELECTRIC MIRROR ANGLE ADJUSTING DEVICE

[75] Inventor: Toshiyuki Kumai, Fujieda, Japan

[73] Assignee: Murakami Kaimeido Co., Ltd., Shizuoka, Japan

[21] Appl. No.: 77,390

[22] Filed: Sep. 20, 1979

[30] Foreign Application Priority Data

Sep. 27, 1978 [JP] Japan ............ 53-131658[U]
May 26, 1979 [JP] Japan ............ 54-070195[U]

[51] Int. Cl.³ .................................. G02B 7/18
[52] U.S. Cl. .................... 350/289; 248/487; 248/481
[58] Field of Search ............ 350/289; 248/487, 481, 248/484

[56] References Cited

U.S. PATENT DOCUMENTS

| | | | |
|---|---|---|---|
| 3,609,014 | 8/1971 | Kurz | 350/289 |
| 3,857,631 | 12/1974 | Morgenstern | 350/289 |
| 3,972,597 | 8/1976 | Repay et al. | 350/289 |
| 4,056,253 | 11/1977 | Repay et al. | 350/289 |
| 4,202,603 | 5/1980 | Miyauchi | 350/289 |

FOREIGN PATENT DOCUMENTS

| | | | |
|---|---|---|---|
| 4737888 | 6/1970 | Japan | 350/289 |
| 51-35983 | 2/1976 | Japan | 350/289 |
| 5383239 | 12/1976 | Japan | 350/289 |
| 5393847 | 12/1976 | Japan | 350/289 |

*Primary Examiner*—Jon W. Henry

[57] ABSTRACT

An electric device for adjusting the angle of reflection of a mirror mounted on a motor vehicle. The mirror is pivotally connected to a housing containing a reversible motor and driving mechanism. One end each of a pair of adjusting members is attached to the back side of the mirror pivotally and unrotatably. The adjusting members may be adapted to swing conically on their roots. Each adjusting member is provided with a worm wheel which, in turn, is in meshing contact with a worm gear. The worm gears are mounted on an axially slidable slide shaft or slide cylinder which is connected with the output shaft of the reversible motor. The slide shaft or slide cylinder is adapted to transmit the driving force of the reversible motor selectively to either of the worm gears. Thus, the driving force of the reversible motor is transmitted selectively through either of the worm gears and its respective worm wheel to either of the adjusting members which is now axially moved thereby and pushes or pulls the mirror.

3 Claims, 16 Drawing Figures

(a)    (b)

ELECTRIC MIRROR ANGLE ADJUSTING DEVICE

BACKGROUND OF THE INVENTION

1. This invention relates to an electric mirror angle adjusting device for a mirror mounted on a fender or the like, of a motor vehicle.

2. Description of the Prior Art

Conventional electric mirror angle adjusting devices have comprised a pair of adjusting members for the adjustment of the mirror angle each of which is connected with an electric motor. Because these devices need two electric motors, they have been too expensive and bulky.

Recently, the whole device has been made smaller and lighter by using a single electric motor, the driving force of which is selectively transmitted to either of the adjusting members as found in U.S. Pat. No. 3,972,597, U.S. Pat. No. 4,056,253 and Japanese Patent Laid-Open Publication No. Sho 53-83239. In the former two, a worm wheel is attached to each adjusting member, and a worm gear, attached to the output shaft of an electric motor, is selectively engaged with either of the worm wheels. In the latter, each adjusting member is provided with a worm wheel and a worm gear in meshing contact therewith, and a change-over gear connected with the output shaft of an electric motor is alternately engaged with the worm gears. In these devices of the prior art in which the worm gear or change-over gear is shifted, its teeth are liable to collide with those of fixed gears. Therefore, the change-over is not performed smoothly, and the gears are liable to be damaged. In such mechanisms, it is desirable to keep all the gears in meshing contact with each other and to hold them firmly in a housing in order to transmit the driving force smoothly and accurately. A device disclosed by U.S. Patent No. 3,857,631 uses belts in place of the adjusting members to adjust the mirror angle. However, it is rather complicated in construction with several gears, pulleys, etc. and is not necessarily easy to manufacture.

BRIEF SUMMARY OF INVENTION

It is therefore an object of this invention to provide an electric mirror angle adjusting device which has obviated all the above-mentioned disadvantages of the devices of the prior art.

It is another object of the invention to provide an electric mirror angle adjusting device in which each adjusting member is adapted to swing conically on its root.

It is a further object of the invention to provide an electric mirror angle adjusting device which is simple in construction and compact.

It is an even further object of the invention to provide an electric mirror angle adjusting device which has sufficient durability and reliability.

It is an additional object of the invention to provide an electric mirror angle adjusting device which permits easy manual adjustment of the mirror angle.

These and other objects have been attained by an electric mirror angle adjusting device which includes a pair of adjusting members pivotally attached to the back side of a mirror, and a special change-over means through which the driving force of a reversible motor is selectively transmitted to either of the adjusting members to move it axially.

These and other objects and advantages of the invention will appear more fully from the following description.

DETAILED DESCRIPTION

Figure 1:
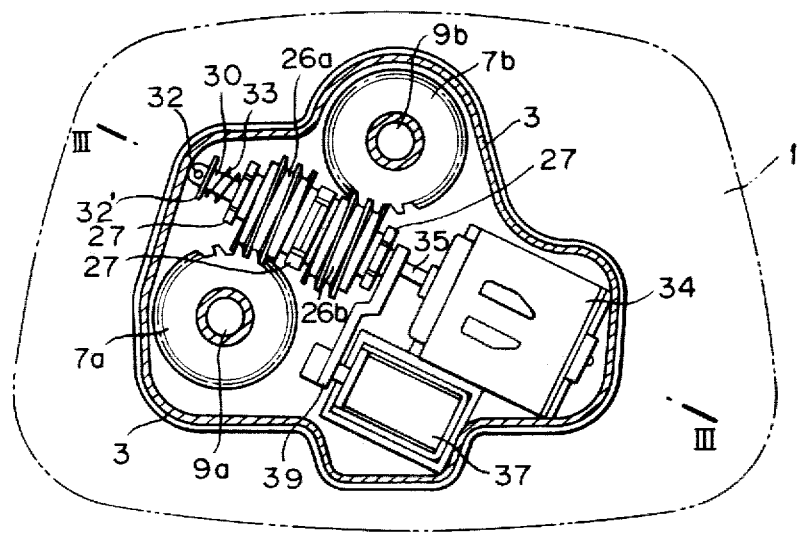
FIG. 1 is a sectional rear view of an electric mirror angle adjusting device embodying the invention.

The present invention will now be described in detail, with reference to embodiments illustrated in the drawings.

Numeral 1 represents a mirror. Numeral 2 represents a mirror holder for holding the mirror 1. Numeral 3 represents a housing for a reversible motor and driving mechanism provided behind the mirror holder 2. The housing 3 is provided on its front side with a supporting rod 4 which projects forward. The supporting rod 4 has a pivot 5 at its end, and the pivot 5 is fitted in a spherical bearing 6 on the back side of the mirror holder 2 so that the mirror 1 and mirror holder 2 can move relative to the housing 3. The housing 3 is made dividable; it serves to support firmly the reversible motor and driving mechanism, and is fixed to a mounting on the fender or the like.

Inside the housing 3, a worm wheel 7a for an adjusting member for the horizontal adjustment of the mirror angle and another worm wheel 7b for another adjusting member for the vertical adjustment of the mirror angle are rotatably disposed. The axes of the worm wheels 7a and 7b in general, are perpendicular to the mirror 1. The adjusting members 9a and 9b are fitted in the central holes 8a and 8b of the worm wheels 7a and 7b respectively.

Figure 2:
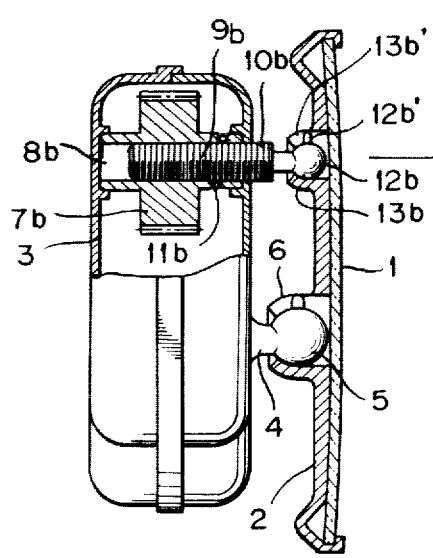
FIG. 2(a) is a partially cutaway side view of the same.
FIG. 2(b) is a perspective view of a part of the same.
Figure 2:
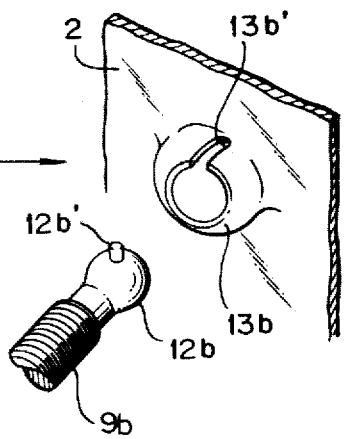
Figure 3:
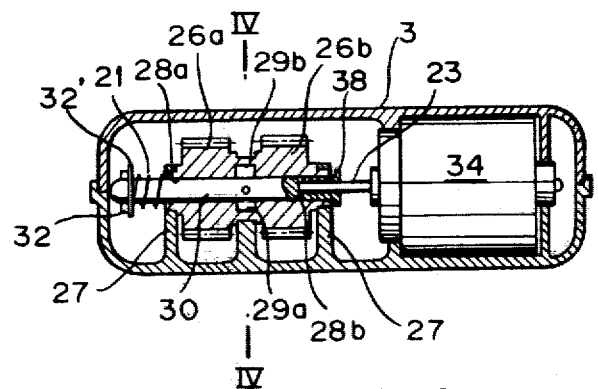
FIG. 3 is a sectional view taken on line III—III of FIG. 1.
Figure 4:
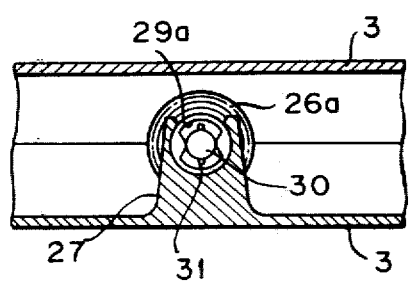
FIG. 4 is a sectional view taken on Line IV—IV of FIG. 3.
Figure 5:
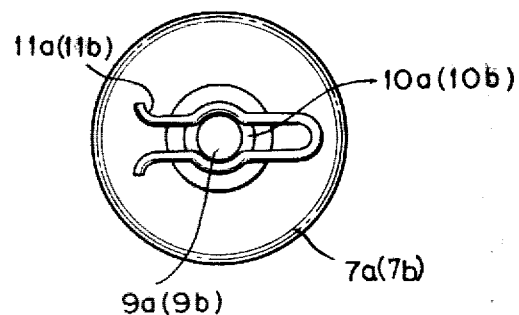
FIG. 5 is a front view of a snap spring.

The adjusting members 9a and 9b will now be described in detail. According to one of the embodiments of this invention, the adjusting members 9a and 9b are provided on their peripheries with threaded portions 10a and 10b respectively as shown in FIG. 2, and these threaded portions 10a and 10b are engaged with the central holes 8a and 8b of the worm wheels 7a and 7b respectively as follows: Holes are bored through the hubs of the worm wheels 7a and 7b respectively, and snap springs 11a and 11b are fitted in the holes respectively as shown in FIG. 5 so that the snap springs are exposed inside the central holes 8a and 8b and engaged with the threaded portions 10a and 10b of the adjusting members 9a and 9b. To engage the adjusting members 9a and 9b with the central holes 8a and 8b of the worm wheels 7a and 7b, it is not always necessary to use such snap springs, and internal thread may be fashioned inside the central holes instead. One end of each adjusting member protrudes from the housing 3 and is provided with a pivot 12a or 12b which is fitted in a spherical bearing 13a or 13b on the back side of the mirror holder 2. The pivots 12a and 12b are provided on their peripheries with projections 12a' and 12b', and these projections are respectively fitted in slots 13a' and 13b' of the spherical bearings 13a and 13b as shown in FIG. 2 so that the adjusting members 9a and 9b swing vertically and horizontally on the spherical bearings 13a and 13b without turning around on their axes.

Figure 9:
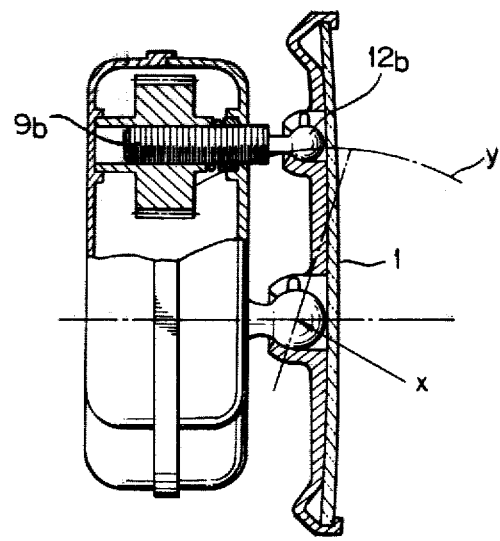
FIG. 9 is a partially cutaway side view of said electric mirror angle adjusting device.

When the mirror 1 is actually operated, however, the pivot at the end of each adjusting member moves along a circular arc with its center at the center X of the pivot 5 of the supporting rod 4, that is, along a dot-dash line y shown in FIG. 9. Therefore, it is preferable to allow each adjusting member to move in this way. Thus, according to another embodiment of this invention, each adjusting member is adapted to swing on its root in the direction of the dot-dash line y. In this connection, detailed description is given below.

Figure 12:
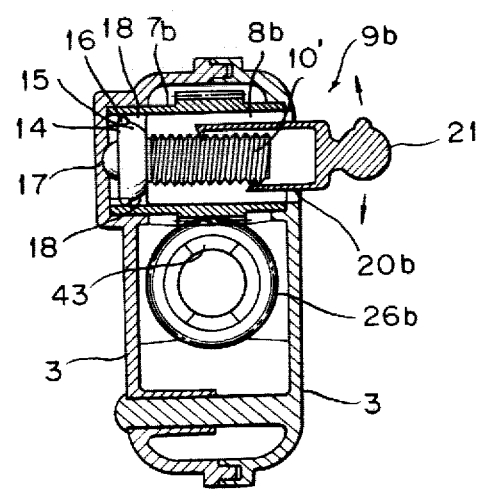
FIG. 12 is a sectional view taken on line XII'XII of FIG. 10.
Figure 14:
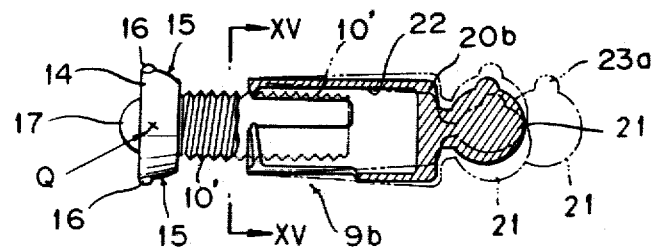
FIG. 14 is a partially sectional side view showing the relation between an adjusting member and an adjusting nut.
Figure 16:
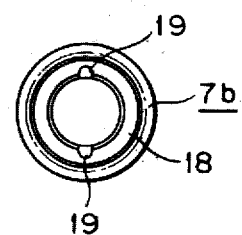
FIG. 16 is an end view of a worm wheel.

As shown in FIG. 14, the root 14 of each adjusting member around its periphery has a curved surface 15, and projections 16 are provided, for instance, diametrically on the curved surface, as a means to ensure that the adjusting member rotates with the worm wheel. A threaded portion 10' is provided at the top of the root 14 (on the right of the root in FIG. 14), and a hemispherical bearing 17 is provided at the bottom of the root 14. The root 14 of the adjusting member is now slidably fitted in one end of the central hole of the worm wheel (7b in FIGS. 12 and 16). The worm wheel 7b seen from left in FIG. 12 is shown in FIG. 16. As obvious from these figures, the worm wheel is provided in one end of its central hole with a sliding surface 18 of a shape corresponding to the curved surface 15, and the sliding surface has concaves 19 corresponding to the projections 16. The projections 16 are fitted in the concaves 19 to ensure that the adjusting member 9b rotates with the worm wheel 7b. Because the curved surface 15 of the adjusting member is in sliding contact with the sliding surface 18, the adjusting member is allowed to swing conically on its root (i.e. along the surface of a cone with an apex at the central point Q of the root 14) as shown by dot-dash lines in FIG. 14.

Figure 15:
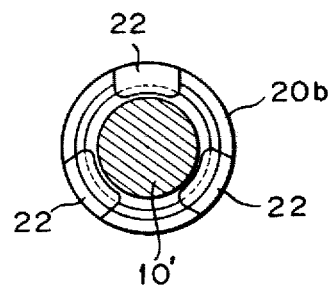
FIG. 15 is a sectional view taken on line XV—XV of FIG. 14.

Reference will now be made to adjusting nuts 20a and 20b each having a pivot and holding the adjusting member in between. Each of the adjusting nuts is made of a flexible synthetic resin. As shown in FIGS. 14 and 15 (enlarged views), it has a pivot 21 at its end and its main body forks into three portions, for instance, each having a catch 22 at the end. Each catch 22 is in pressing contact with the bottom of the threaded portion 10' of the adjusting member as shown in FIGS. 12, 14 and 15, so that, when the threaded portion 10' rotates, the whole adjusting nut 20b moves up and down (right and left in the figures) in parallel with the axis. The adjusting nut 20b may have four catches 22 disposed 90° apart from each other. The pivoted end of each adjusting nut protrudes from the housing 3, and its pivot 21 is fitted in a spherical bearing 24 on the back side of the mirror holder 2. Each pivot 21 is provided on its periphery with a projection 23, and this projection is fitted in the hole 25 of each spherical bearing 24 so that each adjusting member swings vertically and horizontally on the spherical bearing 24 without its adjusting nut turning around on its axis.

Worm gears 26a and 26b in meshing contact with the worm wheels 7a and 7b are provided inside the housing 3. The worm gears 26a and 26b are disposed so that their axes are in the same straight line, and they are supported on a plurality of bearings 27 formed inside the housing 3 and integrally therewith. The worm gears 26a and 26b have central holes 28a and 28b respectively. In these central holes 28a and 28b, either a slide shaft 30 (see FIGS. 1, 3, 6 and 7) or a slide cylinder 41 (see FIGS. 10 and 13) is fitted.

Figure 6:
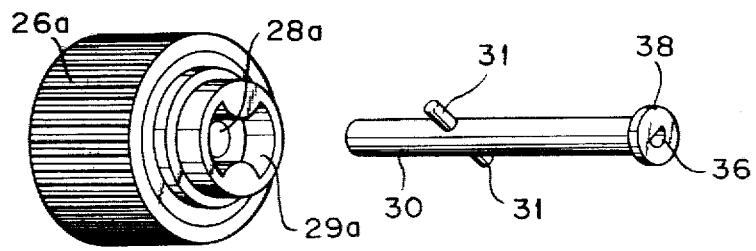
FIG. 6 is a perspective view showing the engagement between a worm gear and a slide shaft.
Figure 7:
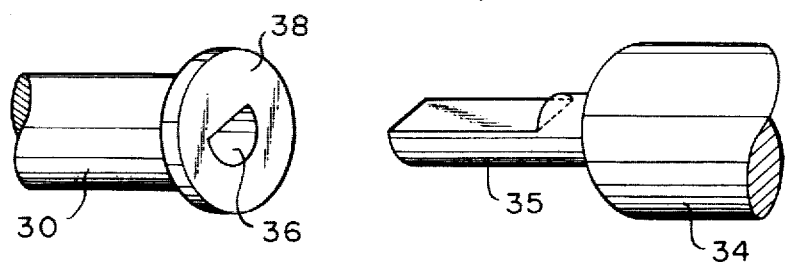
FIG. 7 is a perspective view showing the engagement between the slide shaft and the output shaft of a reversible motor.
Figure 8:
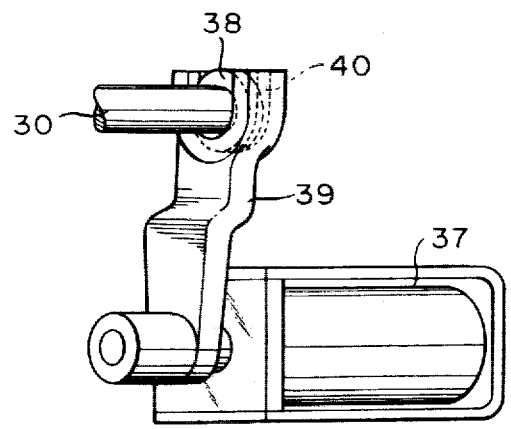
FIG. 8 is a perspective view showing the engagement between the slide shaft and a solenoid.

Reference will be made first to the case of using the slide shaft 30. The central holes 28a and 28b are provided at their ends facing each other with recesses 29a and 29b with which a pin of the slide shaft 30 engages. (This pin is to be described later). The recesses 29a and 29b are positioned continuously with each other, and are disposed symmetrically, for instance, in the central holes 28a and 28b as shown in FIG. 6. The slide shaft 30 is axially slidably fitted in the central holes 28a and 28b of the worm gears 26a and 26b. Near the center of the slide shaft 30, a pin 31 projects perpendicularly to the axis thereof so that the pin is fitted either in the recess 29a or the recess 29b. At one end of the slide shaft 30, a washer 32' is fixed with a pin 32. Between the washer 32' and one of the worm gears (or its bearing), a spring 33 is provided, which spring always pulls the slide shaft 30 in one direction so that the pin 31 of the slide shaft is usually in the recess 29a of one of the worm gears. The other end of the slide shaft 30 is connected with the output shaft 35 of a reversible motor 34 fixed inside the housing 3. The slide shaft 30 is rotated by the output shaft 35 but it is axially slidable thereon. This is accomplished by making a semicircular hole 36 at the end of the slide shaft 30 and inserting the end of the output shaft 35 with a similar semicircular section into the hole 36 as shown in FIG. 7. The same end of the slide shaft 30 is further connected as follows with a solenoid 37 for moving the slide shaft in the direction of the axis; The end of the slide shaft 30 is provided with a flange 38, and the end of a control member 39 fixed to the core of the solenoid 37 is connected with the flange 38. As a means to accomplish this connection, a connection member having a shape that in general resembles the letter "U" is integrally provided at the end of the control member 39, a groove 40 is provided inside the connecting member, and the flange 38 of the slide shaft 30 is fitted in the groove 40. See FIG. 8.

Figure 10:
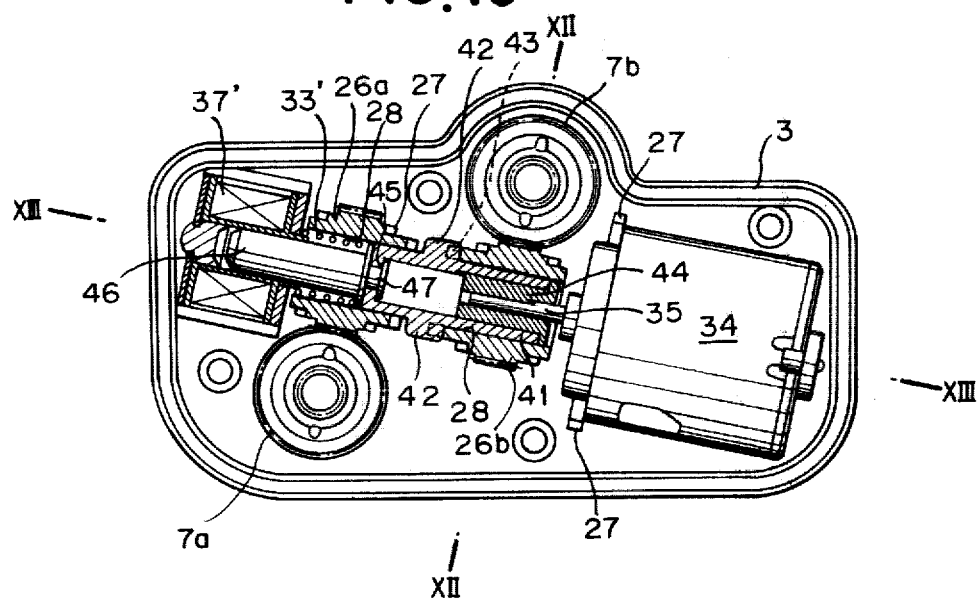
FIG. 10 is a rear view of a preferred embodiment of the invention.
Figure 11:
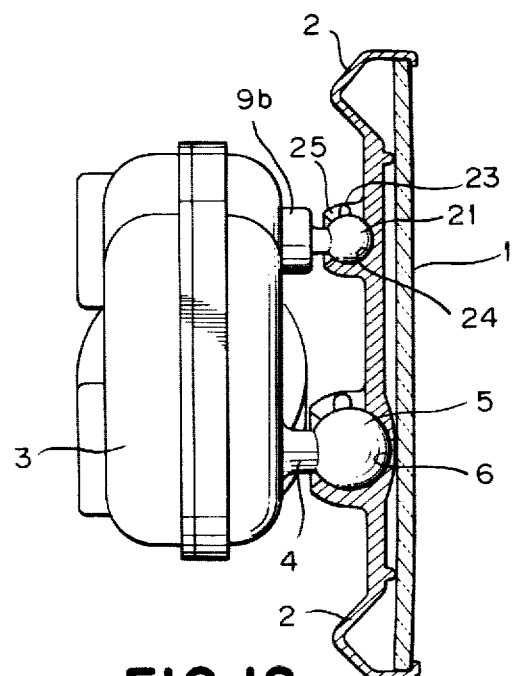
FIG. 11 is a partially cutaway side view of the same.
Figure 13:
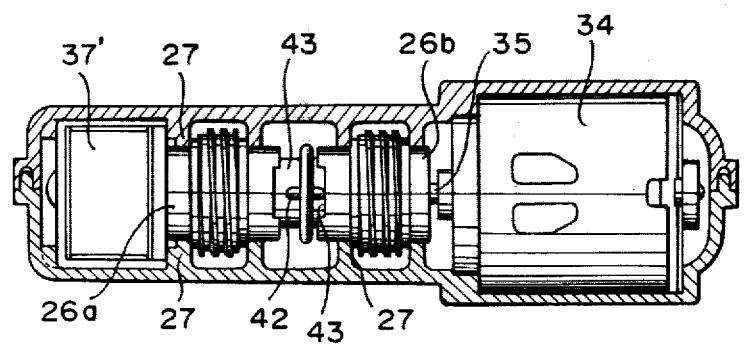
FIG. 13 is a sectional view taken on line XIII—XIII of FIG. 10.

Reference will now be made to the case of using the slide cylinder 41. The slide cylinder 41 is axially slidably fitted in the central holes 28a and 28b of the worm gears 26a and 26b so as to serve both gears. The slide cylinder 41 is provided on its periphery with projections 42 as shown in FIGS. 10 and 13, and the worm gears 26a and 26b are provided at their ends facing each other with recesses 43 corresponding to the projections 42. A collar 44 is fixed inside the slide cylinder 41, and through this collar the slide cylinder 41 is connected with the output shaft 35 of the reversible motor 34 which is fixed on the extension of the worm gear axis. The collar 44 is designed to transmit the motor rotation to the slide cylinder 41 even when the slide cylinder has been axially slid by a solenoid plunger mentioned below. The slide cylinder 41 is provided at its end with a rim 45 projecting inward. The neck 47 of the plunger rod 46 is engaged with this rim. Numeral 33' represents a spring provided between the neck 47 and the casing of the solenoid plunger 37'. This spring always pushes the plunger rod 46 toward the right in FIG. 10. As obvious from FIGS. 10 and 13, the solenoid plunger 37' is disposed coaxially with the worm gears 26a and 26b to make the whole mechanism compact.

The operation of the electric mirror angle adjusting device of the embodiment disclosed in FIGS. 1–8 will now be explained. If the solenoid 37 is not energized, the pin 31 of the slide shaft 30 is in the recess 29a of the worm gear 26a for the horizontal adjustment of the mirror angle because the slide shaft 30 is pulled toward the worm gear 26a by the spring 33. When the slide shaft 30 is rotated by starting the reversible motor 34, the worm gear 26a, in engagement with the slide shaft 30 through the pin 31 and recess 29a, starts rotating. At the same time, the worm wheel 7a in engagement with the worm gear 26a starts rotating and the snap spring 11a fitted in the hole of the worm wheel 7a also starts rotating. The snap spring 11a is in engagement with the threaded portion 10a of the adjusting member 9a, and the adjusting member 9a is not allowed to rotate because the projection 12a' on its pivot 12a is fitted in the slot 13a' of the spherical bearing 13a. Therefore, when the worm wheel 7a starts rotating, the adjusting member 9a starts moving in the direction of the axis and pushes or pulls the mirror holder 2 to the back of which the end of the adjusting member 9a is attached. As a result, the mirror 1 turns on the pivot 5 toward the right or left. At this time, the adjusting member 9b for the vertical adjustment of the mirror angle does not work in spite of the rotation of the reversible motor 34 because the pin 31 of the slide shaft 30 is not fitted in the recess 29b of the worm gear 26b.

To make the vertical adjustment of the mirror angle, the solenoid 37 and the reversible motor 34 are energized by means of a switch. Then, the control member 39 fixed to the core of the solenoid 37 pulls the slide shaft 30 toward the worm gear 26b for the vertical adjustment of the mirror angle against the force of the spring 33. Now the pin 31 of the slide shaft 30 comes out of the recess 29a of the worm gear 26a and enters the recess 29b of the worm gear 26b. As a result, the rotation of the reversible motor 34 is transmitted only to the worm gear 26b, and the adjusting member 9b moves in the direction of the axis in the same way as mentioned above to make the vertical adjustment of the mirror angle.

The manual adjustment of the mirror angle can be made by pushing the face of the mirror 1 with fingers accordingly. When it is pushed with fingers, the adjusting member 9a or 9b widens the snap spring 11a or 11b which limits the axial movement thereof, and moves in the direction of the axis. Thus, the mirror 1 turns on the pivot 5.

The operation of the electric mirror angle adjusting device of the embodiment disclosed in FIGS. 10–16 will be explained next. If the solenoid of the solenoid plunger 37' is not energized, the projections 42 of the slide cylinder 41 are in the recesses 43 of the worm gear 26b for the vertical adjustment of the mirror angle because the slide cylinder 41 is pushed toward the right in FIG. 10 by the force of the spring 33'. Therefore, when the reversible motor 34 is started and the slide cylinder 41 is rotated thereby through the collar 44, the worm gear 26b connected through the projections 42 and recesses 43 with the output shaft 35 of the reversible motor 34 starts rotating, and the worm wheel 7b in engagement with the worm gear 26b also starts rotating. At the same time, the adjusting member 9b engaged through the projectings 16 and the concaves 19 with the worm wheel 7b starts rotating. The adjusting nut 20b the catches 22 of which are engaged with the threaded portion 10' of the adjusting member 9b is not allowed to rotate because the projecting 23 on its pivot 21 is in the hole 25 of the spherical bearing 24. Therefore, when the worm wheel 7b starts rotating, the adjusting nut 20b starts moving in the direction of the axis and pushes or pulls the mirror holder 2 to the back of which end of the adjusting nut 20b is attached. As a result, the mirror 1 turns on the pivot 5 up or down. At this time, the adjusting member 9a for the horizontal adjustment of the mirror angle does not work in spite of the rotation of the reversible motor 34 because the projections 42 of the slide cylinder 41 are not in the recesses 43 of the worm gear 26a.

To make the horizontal adjustment of the mirror angle, the solenoid of the solenoid plunger 37' and the reversible motor 34 are energized by means of a switch. Then, the plunger rod 46 disposed in the solenoid pulls the slide cylinder 41 toward the left in FIG. 10 against the force of the spring 33'. Now the projections 42 of the slide cylinder 41 come out of the recesses 43 of the worm gear 26b and enter the recesses 43 of the worm gear 26a. As a result, the rotation of the reversible motor 34 is transmitted only to the worm gear 26a, and the adjusting member 9a moves in the direction of the axis in the same way as mentioned above to make the horizontal adjustment of the mirror angle.

The manual adjustment of the mirror angle can be made by pushing the face of the mirror 1 with fingers accordingly. When it is pushed with fingers, the flexible catches 22 of the adjusting nut 20a or 20b are widened by the force of fingers, and the adjusting nut moves in the direction of the axis. Thus, the mirror 1 turns on the pivot 5.

The present invention has many advantages as follows: Because the mechanism of this invention transmits the driving force of the reversible motor selectively to either of the adjusting members without shifting any gear, the change-over operation is dependable and free from collision between gear teeth. Also, this feature makes it possible to firmly hold the worm gears and worm wheels in the housing, to transmit the driving force smoothly and accurately, and to make the whole device stout. Particularly, the change-over and transmission of the driving force are performed simply by fitting the pin of the slide shaft alternately in the recesses of the worm gears or by fitting the projections of the slide cylinder alternately in the recesses of the worm gears. This means of the change-over and transmission makes the mechanism simpler and smaller, reduces the cost of the whole device and improves durability as compared with the conventional means.

According to an embodiment of this invention, each adjusting member is allowed to swing conically on its root and does not receive excessive force even when the pivot at its end moves along the dot-dash line y in FIG.

9 round the center X of the pivot 5 of the mirror supporting rod. As a result, even if there is a slight error in the positions of the adjusting member pivots in relation to the center X, this does not affect the operation of the mechanism at all. Thus, efficiency in manufacture in increased. Furthermore, when the reversible motor, solenoid plunger, etc. are disposed coaxially with the worm gears, the whole device becomes compact.

The present invention also permits the manual adjustment of the mirror angle by utilizing the elasticity of the snap spring engaged with the threaded portion of each adjusting member or the flexibility of the catches of each adjusting nut engaged with the threaded portion of each adjusting member.

Many other embodiments of this invention may be made without departing from the spirit and scope thereof. For instance, it is possible to dispose the solenoid coaxially with the slide shaft and the reversible motor at the side thereof, and connect the reversible motor with the slide shaft by a slide gear or other transmission means. It is also possible to provide recesses on the opposite sides of the worm gears and fix two corresponding pins to the slide shaft. The pin or pins through which the slide shaft is engaged with the worm gears do not always have to be cylindrical in shape, and they may be prismatic or hemispherical projections. Thus, it is to be understood that the invention is not limited to the specific embodiments thereof except as defined in the appended claims.

What is claimed is:

1. An electric mirror angle adjusting device characterized by one end each of a pair of adjusting members for the adjustment of the mirror angle being attached to the back side of a mirror pivotally and unrotatably, said adjusting members being respectively provided around their roots with curved surfaces with projections, said curved surfaces being respectively fitted in round sliding surfaces with concaves provided in the central holes of worm wheels so that the adjusting members respectively rotate with the worm wheels and swing conically on their roots, adjusting nuts with catches holding the threaded portions of the adjusting members in between and being disposed coaxially with the adjusting members respectively, said worm wheels being in meshing contact with worm gears, a slide cylinder being axially slidably fitted in the worm gears, projections provided on the periphery of the slide cylinder being adapted to be selectively engaged with either of the worm gears, said slide cylinder being connected with the output shaft of a reversible motor and adapted to be axially moved by the plunger of a solenoid.

2. An electric mirror angle adjusting device as claimed in claim 1, wherein said reversible motor and solenoid plunger are disposed coaxially with the two worm gears positioned in a straight line.

3. An electric mirror angle adjusting device as claimed in claim 1, wherein said adjusting nuts have flexibility and their catches (22) are disposed 90° or 120° apart from each other, said catches being in pressing contact with said threaded portions of the adjusting members respectively.

* * * * *